Figure 1:
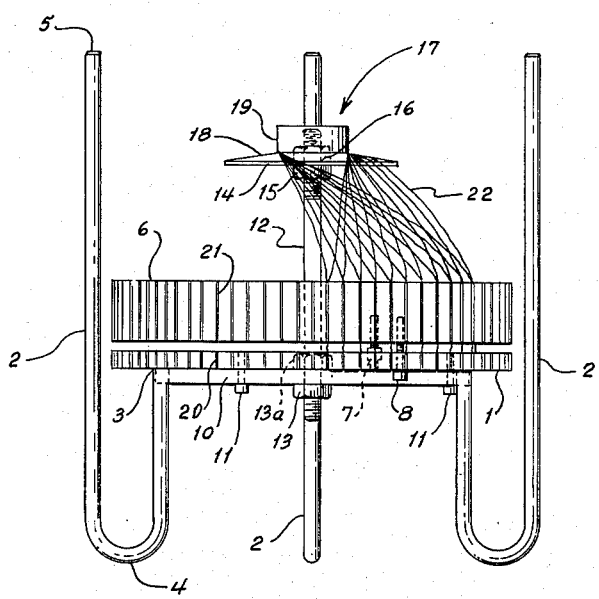

INVENTOR.
RICHARD E. YOUNG
BY Albert M. Parker
ATTORNEY.

Oct. 24, 1961  R. E. YOUNG  3,005,256
DEVICE AND METHOD FOR DETERMINING THE END PATTERN
OF FILAMENT WOUND PRESSURE VESSELS
Filed Nov. 26, 1957  3 Sheets-Sheet 2

INVENTOR.
RICHARD E. YOUNG
BY
Albert M. Parker
ATTORNEY.

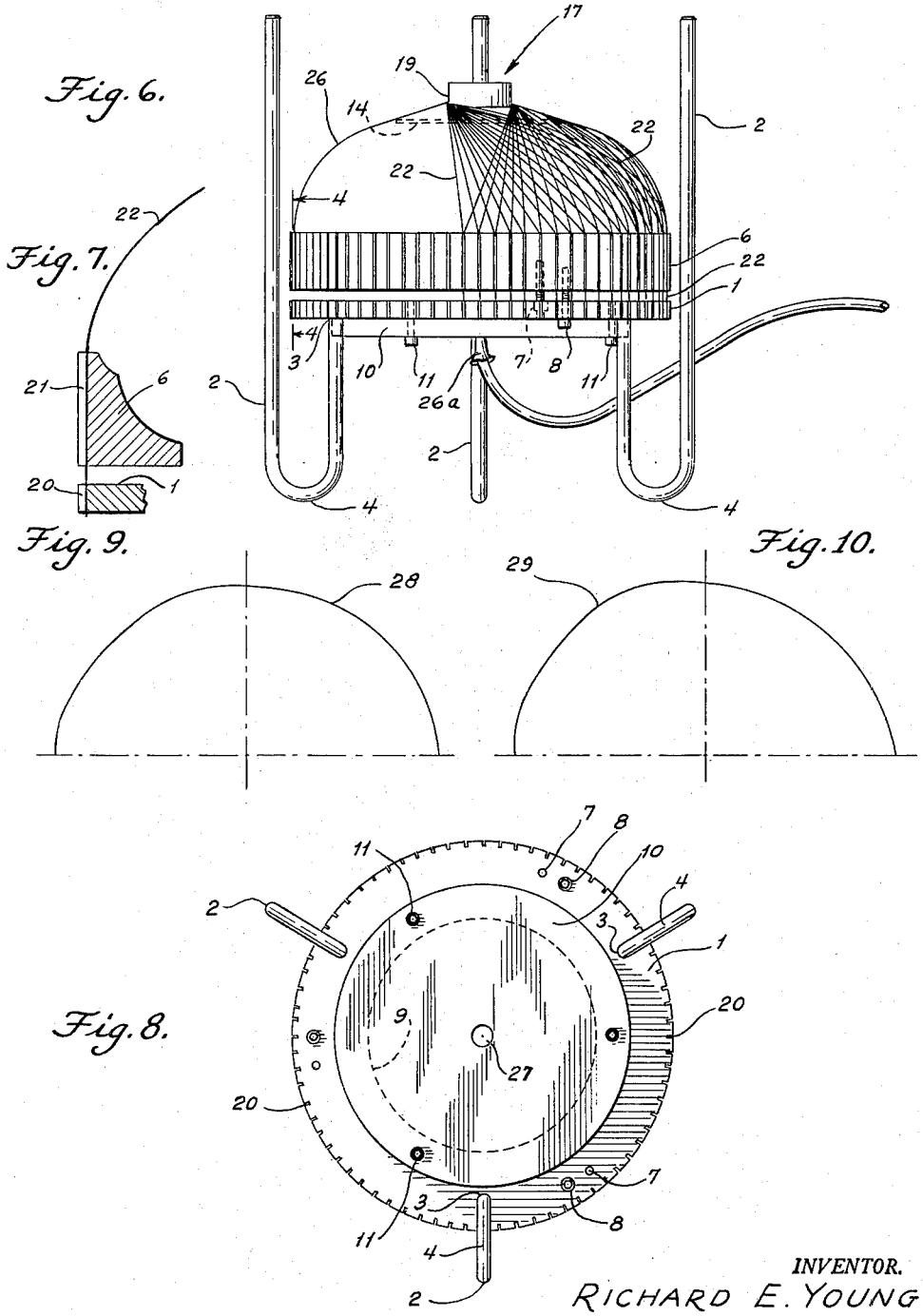

United States Patent Office 3,005,256
Patented Oct. 24, 1961

3,005,256
DEVICE AND METHOD FOR DETERMINING THE END PATTERN OF FILAMENT WOUND PRESSURE VESSELS
Richard E. Young, Rocky Hill, N.J., assignor, by mesne assignments, to Hercules Powder Company, Wilmington, Del., a corporation of Delaware
Filed Nov. 26, 1957, Ser. No. 699,078
14 Claims. (Cl. 29—407)

This invention relates to method and apparatus for determining the end pattern of filament wound pressure vessels.

In the forming of pressure vessels by the winding of helical patterns of filaments, maximum structural performance can only be achieved when the tension load in each filament is constant for every location in the structure. To achieve this, it becomes apparent that as the spacing of the filament windings in the end formation of the vessel diminishes, the radius of curvature of the filament must increase. To fit this relationship, the end shape of the element must be approximately eliptical, with its maximum radius of curvature at the winding terminal zone adjacent the pole.

To generate a complete end shape, particularly where it is integral with a helically wound cylinder, by employing the returned ends of the helixes involved in the winding of the cylinder, presents considerable of a problem. This problem is, however, overcome by the method and apparatus of the invention. Briefly stated, the method of the invention involves the simulation of the end pattern for the desired structure by employing a frame simulating a cylindrical body of a vessel with an end fitting suitably mounted in predetermined position as part of that frame and the development of a netting structure by applying windings over the frame and about the end fitting. The netting must be laced on by hand under such tension as readily becomes apparent to the user of the device.

When the netting structure is completed, the support for the end fitting is removed and the netting structure is loaded from within by the inflating of an air-tight membrane and adjustment of the tension on the netting to bring the surface contour to the precise shape required for constant fiber stress and maximum structural efficiency. Important in this is the adjusting of the structure until the radial section of the curved surface generated has a terminal slope which brings it tangent to the simulated cylindrical body.

Not only does this method enable the end formation to be determined for uniform resistance to internal pressure, but is also serves for examination of the effect of external forces. This is achieved by applying a force to the end fitting which is in proper proportion to the inflation pressure. This will show the effect of the force on the surface profile slope and profile adjustment can be made if needed by adjusting the netting tension.

When the proper end contour has been attained, shadowgraphs of it may be formed on a flat surface and by rotating the device the different profiles projected may be averaged out graphically to give the proper mean curvature.

Once the desired profile is determined, it may be adjusted to size by the use of some means, such as a pantograph, and may be corrected for such things as wall fittings and thickness to be used. A mandrel for use in forming the vessel by helical windings, as taught in my application Serial No. 374,600, filed August 17, 1953 for Filament Wound Hollow Elements and Methods for Making Same (now U.S. Patent No. 2,843,153, issued July 15, 1958), is made up with ends contoured in accordance with the end pattern determined.

It is, accordingly, an object of the invention to provide a method for predetermining the contour of an ovaloid end for pressure vessels.

Another object is to provide a method for predetermining such contour for any set of design conditions.

Another object is to provide for the contouring of ovaloid ends for vessels made of helical filament windings.

Still another object is to provide a method for predetermining the shape of such end to provide constant fibre stress in such windings.

Still another object is to provide a method for determining an end pattern of filament wound pressure vessels which may be varied as to size.

A further object is to provide apparatus for predetermining the desired end pattern for a filament wound pressure vessel.

Another object is to provide such apparatus which is simple to employ and fool-proof in its representation.

Further and more detailed objects will in part be obvious and in part be pointed out as the description of the invention taken in conjunction with the accompanying drawing proceeds.

Figure 2:
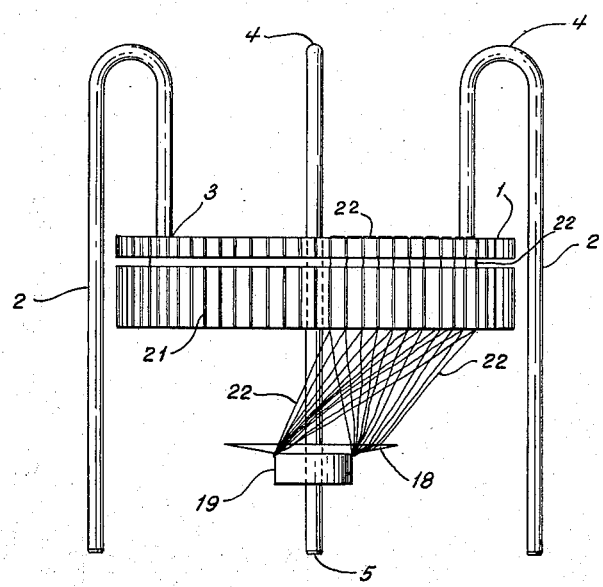
Figure 4:
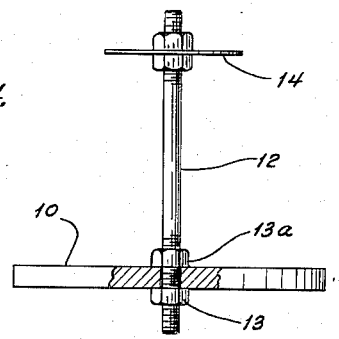
Figure 3:
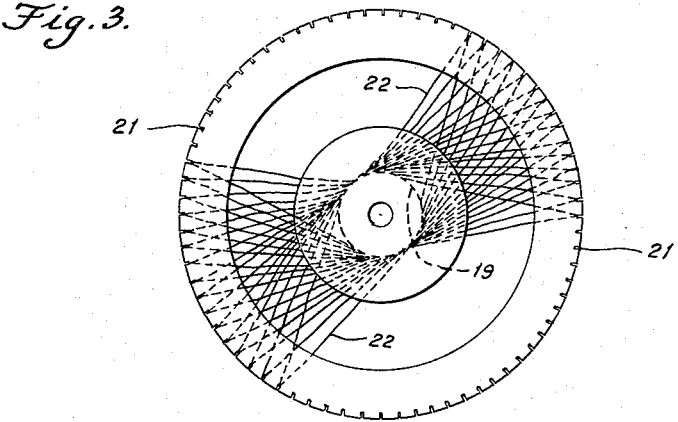
Figure 5:
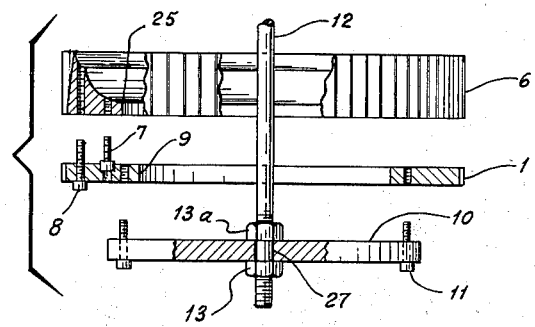

In that drawing:
FIG. 1 is a front elevation of the apparatus of the invention assembled in upright position ready for use.
FIG. 2 is an elevation of apparatus in reversed position with parts thereof removed.
FIG. 3 is a top plan view of the device as shown in FIG. 2.
FIG. 4 is an elevation of the closing plate supporting stem assembly per se.
FIG. 5 is an exploded view of the receiving ring, base ring and closing plate in their relative positions.
FIG. 6 is a view similar to FIG. 1 but showing the apparatus with the netting structure in place and with the inflatable member in inflated condition therewithin.
FIG. 7 is a fragmentary vertical section of the rings with the filaments laced therein taken on line 4—4 of FIG. 6 and looking in the direction of the arrows.
FIG. 8 is a bottom plan view of the apparatus as viewed from beneath in FIGS. 1 and 6; and
FIGS. 9 and 10 are representative shadowgraphs illustrating the manner in which simulated end contours are taken off for use in the forming of mandrels.

The apparatus of the invention and for carrying out the method thereof has a fixed base ring 1 which is supported by a plurality of identical legs 2, here shown as three in number. These legs are double ended in the sense that they are attached to the ring 1, at the position 3, extend down to return bent portions 4 and then extend upwardly to their ends 5. These ends are well above the base ring 1 and the adjustable receiving ring 6, for reasons that will appear hereinafter.

The adjustable receiving ring 6 of the same diameter as the base ring 1 and axially aligned therewith is mounted above the base ring 1, as viewed in FIG. 1, for axial adjustment with respect thereto. That adjustment is effected by pairs of screws 7 and 8 seated in the base ring 1 and positioned in pairs in spaced positions around the base ring. Three pairs of these screws, as seen in FIG. 5, are adequate. The screw 7 of each pair serves to pull the ring 6 down with respect to the ring 1, whereas the screw 8 serves to force it upward. Screw 7 is seated down into the ring 1 from its upper surface, having its head engaged against a shoulder. That head is formed to receive an Allen wrench, and lies above the bottom surface of the base ring 1. An opening in the ring communicates with the head.

The base ring 1 is formed with a central opening therethrough, as shown at 9 in FIGS. 5 and 8. That opening is normally closed by means of the end plate 10 suitably secured concentrically to the undersurface of the base ring 1 by a plurality of screws 11, here shown as three in number. In the initial stage of use of the apparatus for carrying out the method of the invention, as shown in FIG. 1, the plate serves as a support for a center stem 12. That stem, positioned axially of the device, is secured to the plate 10 where it passes through the center thereof, as indicated by the nuts 13 and 13a, thus the stem 12 cannot move up or down with respect to the plate 10 from its set position. At its upper end the stem 12 carries suitable means for positioning an end fitting at the preselected height with respect to the receiving ring 6. The provision here shown for mounting an end fitting is a mounting plate 14 locked in axial position on the stem 12 by means such as nuts 15 and 16. Adjustment of the height of the plate 14 is, of course, provided for by movement of the nuts 15 and 16 and additionally by movement of the nut 13 and its counterpart 13a on the inner side of the plate 10, if movement is desired there.

The height of the polar fitting 17, within reasonable limits, is easily determinable after the device has been tried a few times. Fundamentally, the positioning of it should be such that when a netting pattern of threads is laid across the upper surface 18 of the base of the fitting tangent to its neck 19 under generally uniform tension, those threads will become tangent to the cylinder of the slots in the ring 6 at the base of those slots. When such netting is suitably convexly outwardly curved by the inflation of an internal membrane, minor variations in the inflated contour can be effected by the adjustment of the ring 6 with respect to the ring 1.

Coming now to the application of threads to form the netting structure, it will be seen that both the base ring 1 and the receiving ring 6 are provided with a plurality of grooves extending parallel to the axis of the rings. Furthermore, the grooves 20 of the ring 1 and those 21 of the ring 6 are in alignment. The depth and direction of extension of these grooves are best shown in the cross sectional view of FIG. 3. Coming back to FIG. 1, it will be seen that the threads 22 are laced over the surface 18 of the fitting 17, extend down through the slots 21, through the slots 20 mated therewith and across beneath the ring 1 for a suitable number of slots until, when brought back upwardly again, they will again lie tangent to the outer surface of the neck 19 as they again pass over the end fitting 18. Actually, the forming of the netting structure can commence at the bottom by anchoring the beginning of the thread to one of the legs 2 and proceeding from there.

Though only a few of the threads are shown in FIGS. 1 and 2, for the purposes of illustration, it is to be understood that threads will be drawn up through all of the slots 20 and 21 so as to form a complete pattern, as seen in FIG 6, except that, until an inflatable member is employed within the netting, the threads will not be expanded outwardly to the curved formation shown in FIG. 6.

Once all of the threads have been applied to the device in its FIG. 1 condition in order to form the complete netting, the next step is to turn the device upside down removing the plate 10 taking with it the stem 12 which has supported the fitting 17 in its upright position. Then the device will appear as seen in FIGS. 2 and 3. The fitting 17, being carried by the netting, will remain in place so long as the device is left in this upside down position. The next step then is to load the threads of the netting structure to bring the surface contour to the precise shape required for constant fiber stress and maximum structural efficiency.

This is done by the insertion of a suitable inflatable member down through the opening 9 in the ring 1 and through the corresponding opening 25 in the ring 6. This member, which may merely be a balloon 26 of sufficient strength for the job, is seated within the basket formed by the netting of the threads 22. The stem 12 having been removed from the plate 10 by the removal of the nut 13, the neck 26a of the balloon is passed through the opening 27 formerly occupied by that stem. Then the plate 10 is reapplied to the undersurface of the base plate 1, the balloon is suitably pumped up to load the netting structure and bring the surface contour of the netting and balloon to the precise shape required for constant fiber stress and maximum structural efficiency. This will obviously take place in the natural contouring of the netting as the balloon or other inflatable member is inflated.

The term "closing end position" or "position of the closing end" as used herein and in the claims with reference to the end pattern means the position on the axis of the end pattern where the pattern or any extension thereof intersects the axis.

If after the inflation of the balloon it appears the contouring of the netting is not such as to produce the desired ideal condition, the contour can be adjusted to a small degree, and normally to a sufficient degree, by adjusting the position of the ring 6 with respect to the ring 1 through the action of the appropriate ones of the screws 7 and 8. This ideal condition is one in which the profile of the netting formation will be tangent to the cylinder generated by the bottoms of the grooves in the ring 6 at the upper face of that ring.

Obviously the balloon when inflated will hold up the end fitting 17 and, further than this, the mounting of the end fitting may be employed to examine the effect of external forces on the end formation as simulated by the netting structure. This is achieved by applying force to the end fitting proportioned to the inflation pressure in the same relation that the anticipated force would be expected to bear to the resistance to distortion provided by the end formation of the eventual vessel.

Once the curvature of the simulated end formed out of the inflated netting pattern 22 is determined, shadowgraphs thereof can be taken at different positions, as indicated at 28 in FIG. 9 and 29 in FIG. 10. As many of these can be taken as desired and they can be superposed and averaged out to give an average curvature. That average curvature can then be employed for the forming of the ends of a suitable mandrel for use in the winding of the vessel in question.

Though a single device of somewhat limited adjustability may be employed for carrying out the method of the invention, it is to be understood that mandrels for use in the fabrication of vessels of different sizes with different sized ends can be readily constructed by tracing the average curve determined from the use of the device as described by means of a pantograph and thus enlarging or reducing the size of the end as desired. Then, again, the device permits a reasonable range of positioning as regards the end fitting due to the adjustability of the positioning of that fitting on the stem 12 and the adjustability of the position of the stem 12 with respect to the plate 10.

Though in the foregoing a particular embodiment of apparatus has been shown for exemplifying the apparatus aspect of the invention and for carrying out the method thereof, it is of course to be understood that this showing is merely for illustrative purposes and that other forms of apparatus may be devised without departing from the spirit and scope of the invention from either an apparatus or method standpoint. Also, though the detailing of the method as such has not, in the foregoing been particularly sparated from the description of the device and the use thereof, it is believed that the steps involved in the performance of the method have been sufficiently brought out that it would be mere repetition to relate them per se.

Having described my invention, what I claim as new and desire to secure by Letters Patent is:

1. The method of determining end patterns of filament wound pressure vessels having a central axis which comprises, establishing the circle of maximum circumference of the end pattern in a plane with said axis passing through the center of said circle and at right angles to said plane, establishing a position on said axis in spaced relation with respect to said plane, which position is approximately the position of the closing end of said end pattern on said axis, establishing a relatively smaller circle than said circle of maximum circumference having its center at about said approximate closing end position and lying in a plane perpendicular to said axis, passing thread between said circle of maximum circumference and said relatively smaller circle to form a net-work of thread therebetween, and expanding with uniform pressure said net-work outwardly from the inner side thereof to form an end curvature wherein all the threads are in uniform tension.

2. The method as in claim 1 wherein the thread is passed under substantially uniform tension between said circle of maximum circumference and said relatively smaller circle to form a net-work of threads therebetween.

3. The method as in claim 1 wherein said thread is substantially continuous.

4. The method as in claim 1 wherein the step of expanding with uniform pressure said net-work outwardly from the inner side thereof is effected by inflating a balloon interiorly of said net-work.

5. The method as in claim 1 wherein the relatively smaller circle is supported and the support is removed prior to expanding with uniform pressure the net-work outwardly.

6. The method of determining end patterns of filament wound pressure vessels having a central axis which comprises, establishing the circle of maximum circumference of the end pattern in a plane with said axis passing through the center of said circle and at right angles to said plane, establishing a position on said axis in spaced relation with respect to said plane, which position is approximately the position of the closing end of said end pattern on said axis, establishing a relatively smaller circle than said circle of maximum circumference having its center at about said approximate closing end position and lying in a plane perpendicular to said axis, passing threads from said circle of maximum circumference to said relatively smaller circle and thence to other positions on said circle of maximum circumference to form a net-work of threads therebetween, securing said threads at said circle of maximum circumference, and expanding with uniform pressure said net-work outwardly from the inner side thereof to form an end curvature wherein all the threads are in uniform tension.

7. The method of determining end patterns of filament wound pressure vessels having a central axis which comprises, establishing the circle of maximum circumference of the end pattern in a plane with said axis passing through the center of said circle and at right angles to said plane, establishing a position on said axis in spaced relation with respect to said plane, which position is approximately the position of the closing end of said end pattern on said axis, seating in upright position with respect to said plane a fitting having a cylindrical neck and a flanged base, said fitting being seated coaxially with said central axis and having its flanged base substantially at said approximate closing end position, passing threads from positions on said circle across said flanged base tangent to said cylindrical neck to form a net-work of threads therebetween, securing said threads at said circle, removing the support for said fitting, and expanding with uniform pressure said net-work outwardly from the inner side thereof to form an end curvature wherein all the threads are in uniform tension.

8. The method of claim 7 wherein said threads are passed under substantially uniform tension from positions on said circle of maximum circumference across said flanged base tangent to said cylindrical neck to form a net-work of threads therebetween.

9. The method as in claim 7 wherein said threads are passed from positions on said circle of maximum circumference across said flanged base tangent to said cylindrical neck and thence back to positions on said circle which are substantially diametrically opposite the starting positions, respectively, to form a network of threads between said fitting and said circle.

10. The method as in claim 9 wherein said threads are passed under substantially uniform tension from positions on said circle of maximum circumference across said flanged base tangent to said cylindrical neck and thence back to positions on said circle which are substantially diametrically opposite the starting positions, respectively, to form a net-work of threads between said fitting and said circle.

11. The method of determining the end patterns of filament wound pressure vessels having a central axis, which comprises, establishing the circle of maximum circumference of the end pattern in a plane with said axis passing through the center of said circle and at right angles to said plane, establishing a position on said axis in spaced relation with respect to said plane, which position is approximately the position of the closing end of said end pattern on said axis, establishing a relatively smaller circle than said circle of maximum circumference having its center at about said approximate closing end position and lying in a plane perpendicular to said axis, passing thread between said circle of maximum circumference and said relatively smaller circle to form a net-work of threads therebetween, expanding with uniform pressure said net-work outwardly from the inner side thereof to form an end curvature wherein all of the threads are in uniform tension, projecting a shadow of said simulated end so formed onto a suitable receiving surface and forming a mandrel with ends in accordance with said shadow.

12. The method as in claim 9 including, projecting a plurality of said shadows from different radial positions of said end, averaging out the curvatures of said shadows, and forming a mandrel from said averaged curvature.

13. The method of determining end patterns of filament wound pressure vessels having a central axis which comprises, establishing the circle of maximum circumference of the end pattern in a plane with said axis passing through the center of said circle and at right angles to said plane, establishing a position on said axis in spaced relation with respect to said plane, which position is approximately the position of the closing end of said end pattern on said axis, establishing a relatively smaller circle than said circle of maximum circumference having its center at about said approximate closing end position and lying in a plane perpendicular to said axis, passing thread under substantially uniform tension between said circle of maximum circumference and said relatively smaller circle to form a net-work of threads therebetween, expanding with uniform pressure said net-work outwardly from the inner side thereof to form an end curvature wherein all the threads are in uniform tension, and adjusting the resulting structure until the curves defined by axially sectioning the end curvature so formed have terminal slopes which bring them tangent to a simulated cylinder formed by moving said circle of maximum circumference along said central axis.

14. The method of determining end patterns of filament wound pressure vessels having a central axis which comprises, establishing the circle of maximum circumference of the end pattern in a plane with said axis passing through the center of said circle and at right angles to said plane, establishing a position on said axis in spaced relation with respect to said plane, which position is approximately the position of the closing end of said end pattern on said axis, establishing a relatively smaller circle than said circle of maximum circumference having its center at about said approximate closing end position and lying in a plane perpendicular to said axis, passing thread between said circle of maximum circumference and said relatively smaller circle to form a net-work of thread therebetween, expanding with uniform pressure said net-work outwardly from the inner side thereof to form an end curvature wherein all the threads are in uniform tension and adjusting the resulting structure to take into account the effect of external forces on the end curvature by applying force to the end fitting appropriately proportioned to the inflation pressure.

References Cited in the file of this patent

UNITED STATES PATENTS

| | | |
|---|---|---|
| 1,500,204 | Richard | July 8, 1924 |
| 1,733,359 | Ferrand | Oct. 29, 1929 |
| 2,332,032 | Troiel | Oct. 19, 1943 |
| 2,366,141 | Alderfer | Dec. 26, 1944 |
| 2,366,359 | Searle | Jan. 2, 1945 |
| 2,373,038 | Lindsay | Apr. 3, 1945 |
| 2,743,514 | Duecy | May 1, 1956 |

UNITED STATES PATENT OFFICE
CERTIFICATE OF CORRECTION

Patent No. 3,005,256  October 24, 1961

Richard E. Young

It is hereby certified that error appears in the above numbered patent requiring correction and that the said Letters Patent should read as corrected below.

Column 6, line 39, for the claim reference numeral "9" read -- 11 --.

Signed and sealed this 10th day of April 1962.

(SEAL)
Attest:

ERNEST W. SWIDER
Attesting Officer

DAVID L. LADD
Commissioner of Patents